United States Patent [19]
Yoshinaka et al.

[11] Patent Number: 5,604,603
[45] Date of Patent: Feb. 18, 1997

[54] SYSTEM AND METHOD FOR RECORDING DIGITAL AUDIO SIGNAL AND DIGITAL VIDEO SIGNAL AND RECORDING MEDIUM FOR SAME

[75] Inventors: Tadaaki Yoshinaka; Takashi Sasaya; Tetsuo Kani; Takeo Ooba, all of Kanagawa, Japan

[73] Assignee: Sony Corporation, Tokyo, Japan

[21] Appl. No.: 248,253

[22] Filed: May 24, 1994

[30] Foreign Application Priority Data

May 28, 1993 [JP] Japan ................... 5-127605

[51] Int. Cl.⁶ .................... H04N 5/78; H04N 5/76
[52] U.S. Cl. .................... 386/100; 360/48; 386/104
[58] Field of Search ................... 358/341, 343, 358/348, 335; 360/19.1, 48

[56] References Cited

U.S. PATENT DOCUMENTS

| | | | |
|---|---|---|---|
| 4,558,378 | 12/1985 | Shibata. | |
| 5,181,146 | 1/1993 | Koga | 358/341 |
| 5,237,461 | 8/1993 | Heitmann et al. | 358/343 |
| 5,287,196 | 2/1994 | Yamashita et al. | 358/343 |
| 5,315,445 | 5/1994 | Fukamoto et al. | 358/343 |
| 5,317,412 | 5/1994 | Morioka | 360/19.1 |
| 5,355,229 | 10/1994 | Arano et al. | 358/343 |
| 5,359,464 | 10/1994 | Wilkinson | 360/19.1 |
| 5,386,323 | 1/1995 | Ishiwata et al. | 358/341 |

FOREIGN PATENT DOCUMENTS

A-0241014  10/1987  European Pat. Off..

*Primary Examiner*—Thai Q. Tran
*Assistant Examiner*—Anand Rao
*Attorney, Agent, or Firm*—William S. Frommer; Alvin Sinderbrand

[57] ABSTRACT

A digital audio and video signal recording system and method wherein erasure of a channel has no major effect on adjoining audio signals in the case of high density recording. The same channel of audio signals are recorded arranged in blocks in a direction orthogonal to the helical track of the magnetic tape. There is a possibility of the occurrence of error at the two outside tracks due to narrowing of the tracks at the time of editing of a channel, but preferably an outer code is added to enable erasure correction.

9 Claims, 6 Drawing Sheets

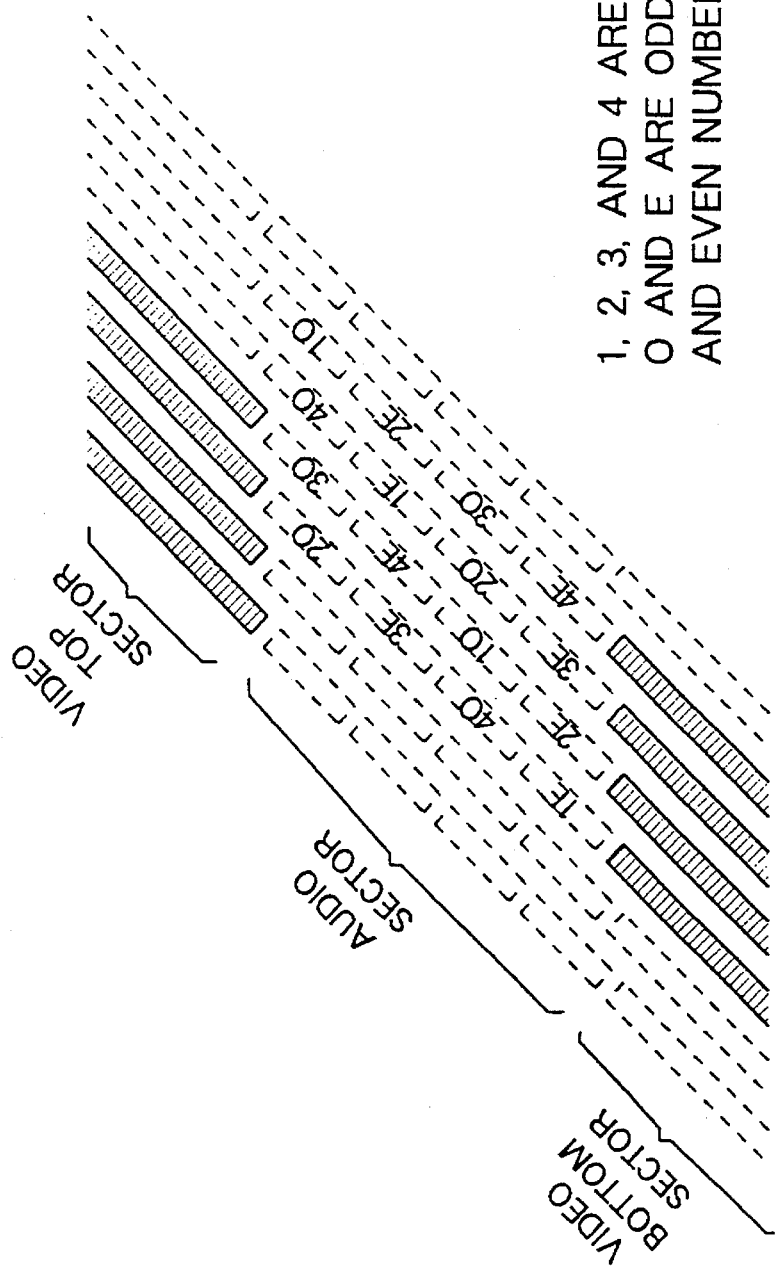

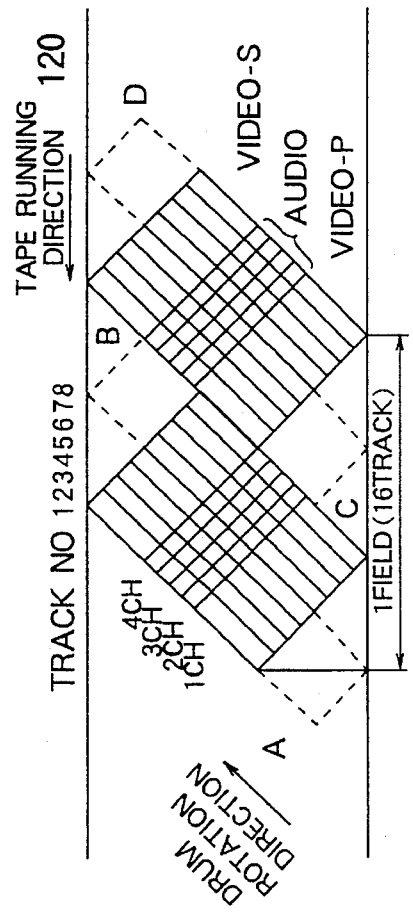
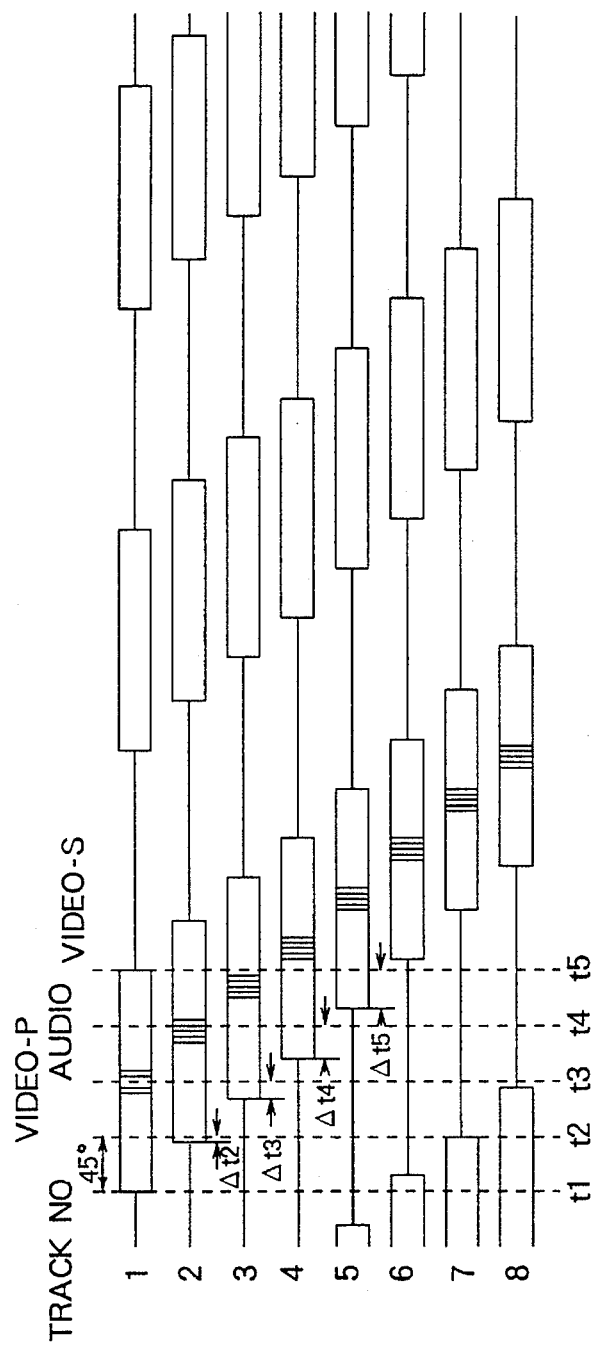
FIG. 5A
FIG. 5B

SYSTEM AND METHOD FOR RECORDING DIGITAL AUDIO SIGNAL AND DIGITAL VIDEO SIGNAL AND RECORDING MEDIUM FOR SAME

BACKGROUND OF THE INVENTION

1. Field of the Invention

The present invention relates to a method and system (apparatus) for recording a digital audio signal and a digital video signal, more particularly relates to a digital audio and video signal recording method and apparatus for arranging into blocks the same channel of digital audio signals and recording them in a direction orthogonal to the helical (inclined) tracks of the recording medium and a recording medium on which audio signals are recorded in this way.

2. Description of the Related Art

In a system for recording and reproducing analog video signals and analog audio signals (analog type VTR), the video signals are recorded on the helical tracks of a magnetic tape and the audio signals are recorded at the edges running along the longitudinal direction of the magnetic tape at the areas outward from where the video signals are recorded.

Also, in a system for recording and reproducing digital video signals and digital audio signals on a magnetic tape (digital VTR), for example, in Japanese Unexamined Patent Publication (Kokai) No. 56-56075, it has been proposed to record the audio signals on the helical tracks with the same orientation as the video signals from the viewpoint of the advantages of the prevention of loss of audio signals when scratches etc. occur in the longitudinal direction of the magnetic tape, the ability to record and reproduce by the same rotary magnetic head, etc.

Further, for example, in Japanese Unexamined Patent Publication (Kokai) No. 58-188304, it has been proposed to change the recording positions of different channels of audio signals with the aim of rescuing "dropouts" at the time of reproduction when recording a plurality of channels of audio signals on the helical tracks of a magnetic tape.

Still further, for example, in Japanese Unexamined Patent Publication (Kokai) No. 58-188305, a so-called method of "H-arrangement" has been proposed to record a plurality of different types of information on helical tracks in separate zones and to record information recorded in a plurality of related adjoining tracks so that their recording positions are aligned on a line orthogonal to the direction of extension of the tracks so that when erasing information recorded on a certain helical track by an erasure use rotary magnetic head at the time of editing etc., it is possible to prevent information recorded on tracks adjoining the erased helical track from being erased and, further, it is possible to prevent the length of the guard-band from becoming longer.

None of these recording methods is intended to record a plurality of channels of audio signals block by block. Further, none of the above-mentioned recording methods are intended for high density recording such as "high vision (or "high-definition")" systems or for high degree error correction.

FIG. 1 is a view showing, for example, the recording format of digital audio signals and digital video signals of the D1 format defined by CCIR recommendation 657. This example of the format is of the H-arrangement. In this example, the audio signals are recorded at the center portion of the helical tracks and video signals are recorded at the two sides. Further, the recording area is decided on for each channel and consideration is given to enable independent editing for each channel. When the audio signal is rewritten, first, data recorded on tracks to be rewritten are erased by an erasure head, and new data are written on those tracks. In the D1 format, a guard-band is provided between tracks, so it is possible to erase audio signals on desired channels without deleting data on adjoining channels.

High density recording on magnetic tapes is being experimented with as represented by "high vision" systems. In such cases, generally use is made of azimuth recording with no guard-bands (guard-band-less azimuth recording).

FIG. 2 is a view of the format of guard-band-less azimuth recording. FIG. 2A is a view of the recording positions of video signals VIDEO and audio signals AUDIO recorded on the magnetic tape, while FIG. 2B is a view the write processing timing of 8 tracks of audio signals AUDIO and video signals VIDEO before recording. One field is comprised of 16 tracks, but here only 8 tracks are illustrated.

As illustrated in FIG. 2A, the 8 tracks of audio signals AUDIO are recorded at the center of the helical tracks of the magnetic tape. As illustrated in FIG. 2B, the video signals VIDEO and audio signals AUDIO recorded on the tracks are comprised of the front video signals VIDEO-P, the audio signals AUDIO, and the back video signals VIDEO-S. The different tracks of audio signals AUDIO are recorded on the magnetic tape with certain phase differences between them.

When using the D1 audio signal recording format for the guard-band-less azimuth recording, a problem arises during rewriting of a helical track of audio signals, often performed on professional-use VTR's, namely, a partial erasure of the audio signal data recorded on the adjoining helical tracks by the erasure head. The reason is that, in general, the erasure head is set wider than the recording head so as not to allow any data meant to be erased to remain. So the erasure head scans even the adjoining tracks during erasure and part of the audio signal data recorded on the adjoining tracks ends up being erased, that is, narrowing of the adjoining tracks occurs. In addition, during cross (mutual) editing, track deviation also occurs, so unavoidably part of the audio signals recorded on the adjoining tracks end up being erased.

The above-mentioned problem becomes particularly remarkable in the case of a professional-use digital VTR for high density recording where the track widths and pitch are much narrower (narrow-tracks), in particular, "high vision" VTR's.

SUMMARY OF THE INVENTION

An object of the present invention is to provide a digital VTR and method which do not delete a portion of the data of tracks during editing work even during guard-band-less azimuth recording.

Another object of the present invention is to provide a magnetic recording medium on which audio signals are recorded in this way in the above digital VTR.

BRIEF DESCRIPTION OF THE DRAWINGS

The above and other objects and features of the present invention will be described in detail with reference to the accompanying drawings, in which:

FIG. 1 is a view of the recording format of conventional audio signals;

FIG. 5A is a view of a first recording format of audio signals recorded on a magnetic tape by the digital VTR shown in FIG. 3;

FIG. 5B is a timing chart of the combination video and audio signals showing the recording processing;

DESCRIPTION OF THE PREFERRED EMBODIMENTS

Figure 3:
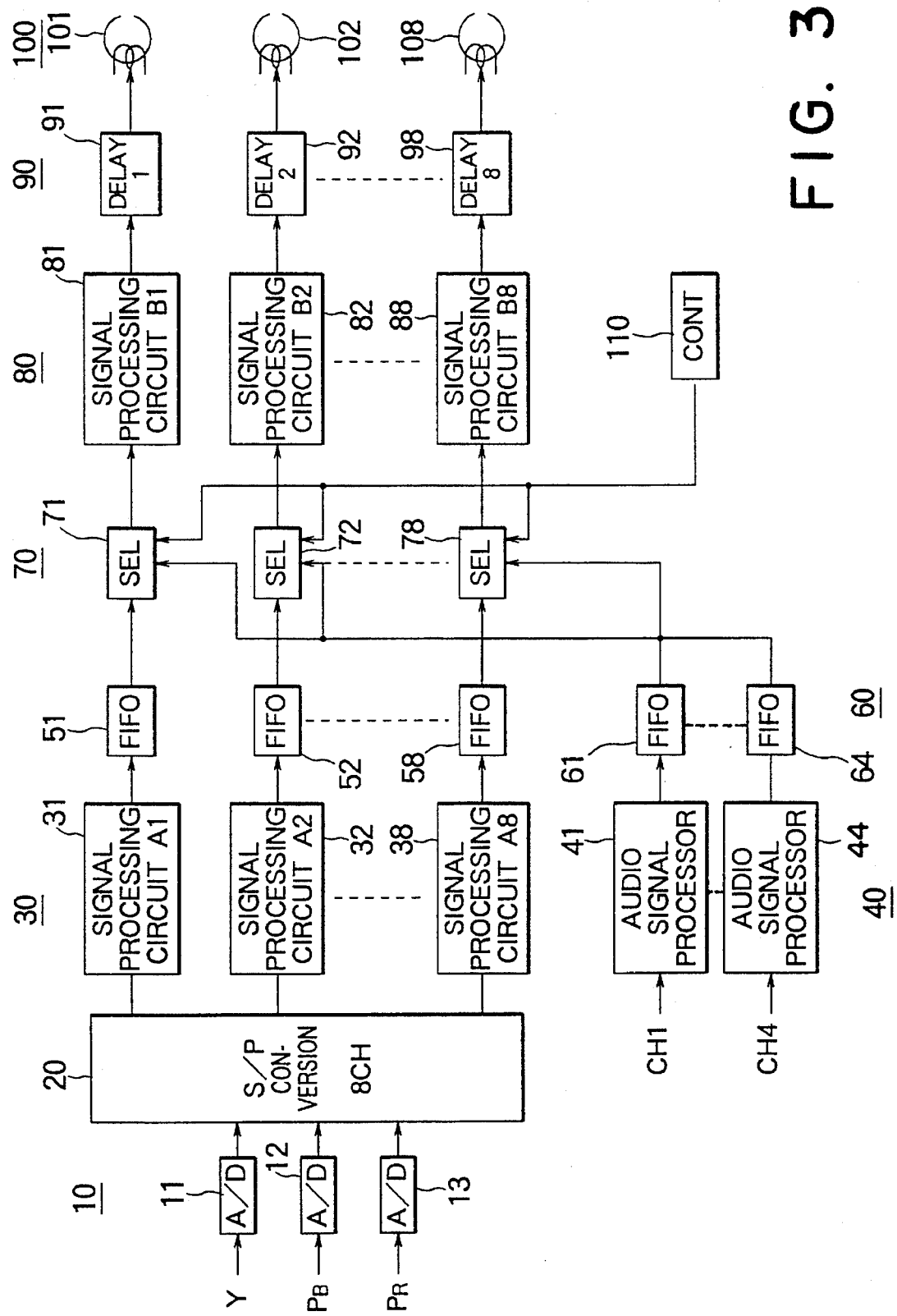
FIG. 3 is a structural view of an example of a digital VTR for recording digital audio and video signals as a preferred embodiment of the present invention.

FIG. 3 is a structural view of a "high vision (high-definition)" digital VTR for recording digital audio and video signals on a magnetic tape according to a preferred embodiment of the present invention.

The digital VTR includes an A/D converter 10, a serial-parallel conversion circuit 20, a video signal processor 30, an audio signal processor 40, a video signal FIFO (first-in-first-out) memory 50, an audio signal FIFO memory 60, a signal selector 70, a signal processor 80, a signal delay circuit 90, a multichannel head (multi head) 100, and a control unit 110.

In the illustrated example, there is shown the case of recording a component signal comprised of a luminance signal Y, a first chrominance signal $P_B$, and a second chrominance signal $P_R$ as a video signal on a magnetic tape as a recording medium over 8 tracks and recording four channels of audio signals on the magnetic tape.

Consequently, the A/D converter 10 is comprised of first to third A/D converters 11 to 13, the video signal processor 30 is comprised of first to eighth video signal processing circuits 31 to 38, the audio signal processor 40 is comprised of first to fourth audio signal processing circuits 41 to 44, the video signal FIFO memory 50 is comprised of first to eighth video signal FIFO circuits 51 to 58, the audio signal FIFO memory 60 is comprised of first to fourth audio signal FIFO circuits 61 to 64, the signal selector 70 is comprised of first to eighth signal selection circuits 71 to 78, the signal processor 80 is comprised of first to eighth signal processing circuits 81 to 88, the signal delay circuit 90 is comprised of first to eighth signal delay circuits 91 to 98, and the multi-head unit 100 is comprised of first to eighth magnetic heads 101 to 108.

Figure 4:
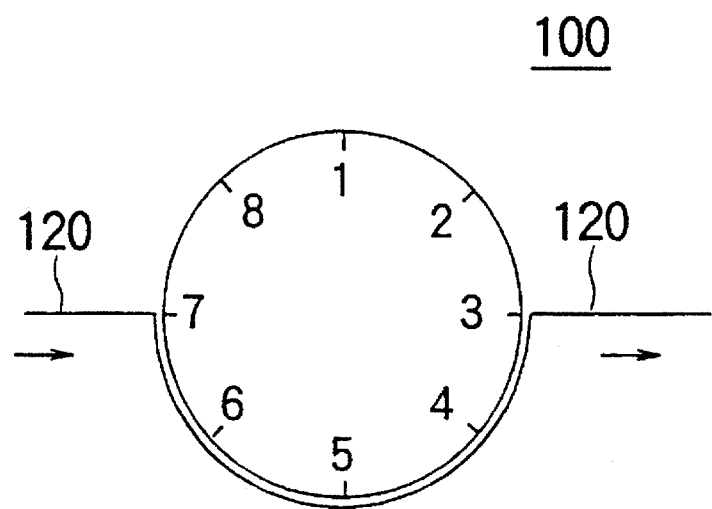
FIG. 4 is a structural view of a multi-head in the digital VTR shown in FIG. 3.

FIG. 4 is a view showing the disposition of the heads of the multi-head unit 100. In a "high vision" digital VTR, to record audio signals and video signals on a magnetic tape 120 at a high speed digital rate, multiple channels, in this example, eight channels, that is, the first to eighth magnetic heads 101 to 108 (1 to 8 in FIG. 4), are disposed at 45 degree equal intervals. This multi-head unit 100 is made to rotate at a high speed to increase the number of tracks per field. In this example, the magnetic tape 120 is wound 180 degrees around the multi-head unit 100 and the multi-head unit 100 is rotated by 120 Hz. Accordingly, one field of data is recorded on 16 tracks.

Next, an explanation will be given of the general operation of the digital VTR illustrated in FIG. 3.

The A/D converter 10 converts the analog mode luminance signal Y, the first chrominance signal $P_B$, and the second chrominance signal $P_R$ to a digital mode luminance signal, a first digital chrominance signal, and a second digital chrominance signal. The digital luminance signal and the first and second digital chrominance signals are called a digital video signal. The serial-parallel conversion circuit 20 converts the digitally converted serial video signals to 8-channel parallel signals. The 8-channel parallel-converted video signals are applied to a video signal processor 30 comprised of first to eighth video signal processing circuits 31 to 38.

The video signal processor 30 adds an outer code, which will be described later with reference to relationship of an inner code, to the video signals and performs shuffling so that these are disposed at random positions. Due to this shuffling, the video signals with the outer codes added are disposed at scattered locations. The outer codes and shuffling will be described later. The shuffled video signals are successively recorded in the first to eighth video signal FIFO circuits 51 to 58 and read out therefrom.

The audio signal processor 40 also adds an outer code to the audio signals and shuffles them so they are disposed at scattered locations. The shuffled audio signals are recorded in the first to fourth audio signal FIFO circuits 61 to 64 and read out.

The video signals read out from the first to eighth video signal FIFO circuits 51 to 58 and the audio signals read out from the first to fourth audio signal FIFO circuits 61 to 64 are selected at the first to eighth signal selection circuits 71 to 78 and applied to the first to eighth signal processing circuits 81 to 88.

The first to eighth signal processing circuits 81 to 88 apply an inner code to the channels of data and add a synchronization signal and index (ID)/address. The inner code will be explained later.

The eight channels of data output from the first to eighth signal processing circuits 81 to 88 are delayed by predetermined times by the first to eighth signal delay circuits 91 to 98, are output to the first to eighth magnetic heads 101 to 108, and are recorded on the magnetic tape 120. To record the above-mentioned signals on the magnetic tape, signal amplification and modulation are performed, but this does not have any direct bearing on the present invention, so details will be omitted.

The control unit 110 performs overall control of the above-mentioned circuit.

An explanation will be given of the relationship between the outer code given by the video signal processor 30 and the audio signal processor 40 and the inner code given by the signal processor 80. The outer code and the inner code form the error correcting code. The outer code constitutes an error correcting code for data separated as much as possible in the recording pattern. The outer code is considered effective for burst-like data loss such as loss of data of video signals or audio signals caused by scratches on the magnetic tape 120. The inner code constitutes an error correcting code for data relatively close in the recording pattern and is considered effective for usual random errors. In general, the inner code is used for the lateral direction of the signal arrangement and the outer code for the longitudinal direction and a product code are constituted by the lateral direction and longitudinal direction to correct errors.

The synchronization (SYNC) signal is for synchronization at the time of reproduction.

FIG. 5A is a view showing the mode of recording video signals VIDEO and audio signals AUDIO on a magnetic tape 120 by the digital VTR shown in FIG. 3, while FIG. 5B is a view showing the timing of eight tracks (channels) of the video signals VIDEO and audio signals AUDIO.

In FIG. 5A, 8 channels of audio signals AUDIO (4 channels+4 channels) are recorded over 16 tracks (8 tracks+8 tracks) at the center portions of the helical tracks of the magnetic tape 120. The multi-head unit 100 turns twice so that 16 tracks, that is, one field, of the video signals VIDEO and audio signals AUDIO are recorded on the magnetic tape 120. The video signals VIDEO are recorded at the two sides of the audio signals AUDIO.

It should be noted that the channels of audio signals AUDIO are recorded aligned in the direction orthogonal to the helical tracks. That is, for each channel, 8 tracks of audio signals AUDIO are recorded arranged in blocks.

In the digital VTR shown in FIG. 3, the video signals applied to the A/D converter 10 and the audio signals AUDIO applied to the video signal processor 30 are adjusted in timing and recorded on the magnetic tape 120 in the recording format illustrated in FIG. 5A.

Referring to the digital VTR illustrated in FIG. 3 and the timing of the video signals VIDEO and audio signals AUDIO illustrated in FIG. 5B, an explanation will be made as to how the video signals VIDEO and audio signals AUDIO are recorded by the format shown in FIG. 5.

The 8 channels of video signals VIDEO given the outer codes and shuffled through the first to eighth video signal processing circuits 31 to 38 and the first to eighth video signal FIFO circuits 51 to 58 and given to the first to eighth signal selection circuits 71 to 78 and the audio signals AUDIO given the outer codes and shuffled through the first to fourth audio signal processing circuits 41 to 44 and the first to eighth video signal FIFO circuits 51 to 58 are controlled by the control means 110 so that, as shown in FIG. 5B, the audio signals AUDIO are positioned at the center of the 8 tracks of the video signals VIDEO, that is, data of a front video signal VIDEO-P, audio signal AUDIO, and rear video signal VIDEO-S arranged together is output from the first to eighth signal selection circuits 71 to 78.

The structure of a front video signal VIDEO-P, audio signal AUDIO, and rear video signal VIDEO-S arranged together is called here a "combination video and audio signal".

In the first to eighth signal processing circuits 81 to 88, the 8 tracks of front video signals VIDEO, the audio signals AUDIO, and the rear video signals VIDEO output from the first to eighth signal selection circuits 71 to 78 comprise successive data given inner codes, synchronization signals, etc. At this time, the eight tracks of combination video and audio signals are the same in phase.

When recording on the magnetic tape 120 using the 8 head multi-head unit 100 shown in FIG. 4, a delay of a phase of 45° is given successively from track 1 to track 8. This phase deviation timing is shown as the times t1 to t5 of FIG. 5B for up to track 5. The time intervals between the successive times t1 and t2 and the times t2 and t3 correspond to 45° phase.

Figure 2A:
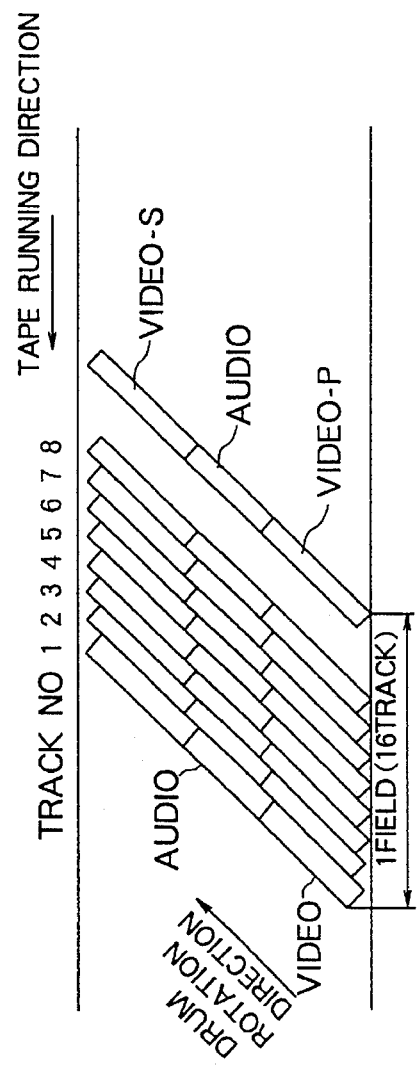
FIG. 2A is a view of conventional audio signal recording positions.
Figure 2B:
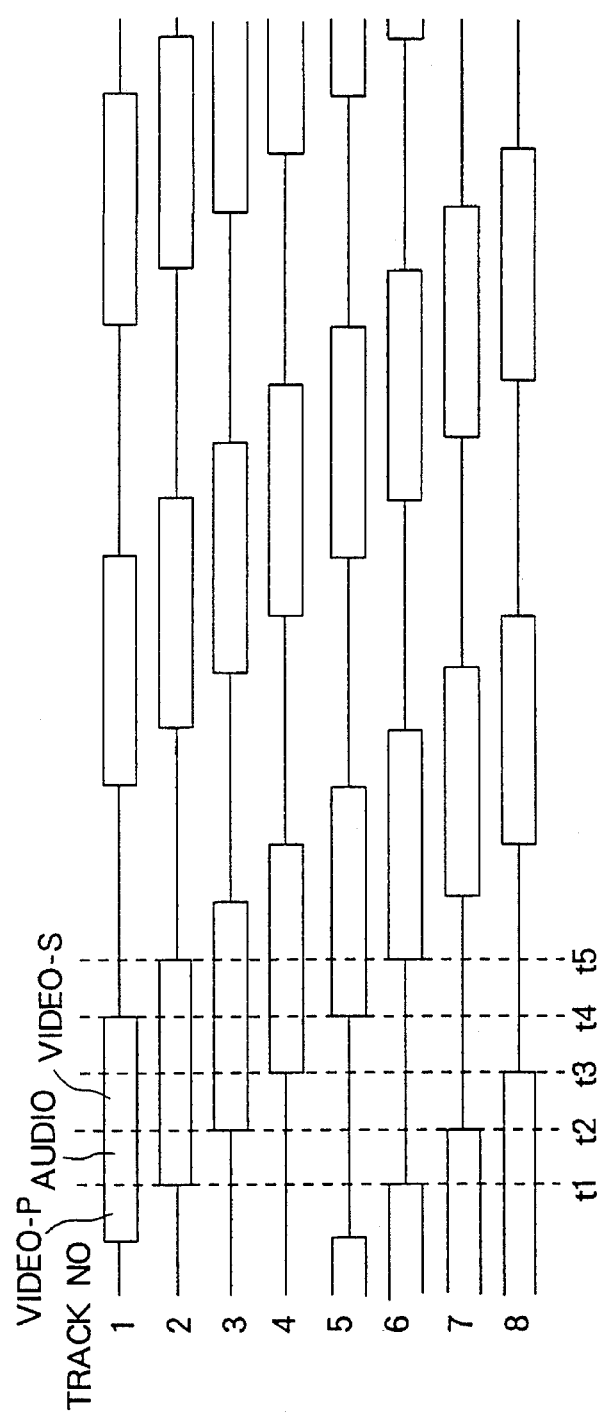
FIG. 2B is a view of the write processing timing.

However, with such timing adjustment (phase adjustment), as shown in FIG. 2A, the audio signals AUDIO recorded on the helical tracks of the magnetic tape 120 are shifted in position with each track and a problem arises when part of the audio signals AUDIO on adjoining tracks are erased at the time of the above erasure by the erasure head.

In the digital VTR illustrated in FIG. 3, as shown in FIG. 5A, the different tracks of combination video and audio signals are advanced in phase 45° for the times t2 to t5, so that the same channels of audio signals AUDIO are recorded arranged at the same positions in the direction orthogonal to the helical tracks. That is, for example, when the first track is used as the reference, the combination video and audio signals recorded on the second track are advanced by exactly $\Delta t2$ from the time t2. The combination video and audio signals recorded on the third track are advanced by exactly $\Delta t3$ from the time t3. However, $\Delta t3 = 2 \cdot \Delta t2$. Below, the combination video and audio signals recorded on the third to eighth tracks are advanced from the reference time ti by exactly $\Delta ti = (i-1)\Delta t2$ (where, i shows the track number).

In other words, the delay times at the first to eighth signal delay circuits 91 to 98 differ. For example, the second signal delay circuit 92 gives a delay of exactly the time corresponding to the time corresponding to 45° minus $\Delta t2$ with respect to the first signal delay circuit 91, the third signal delay circuit 93 gives a delay of exactly the time corresponding to the time corresponding to 45° minus $\Delta t3$ with respect to the second signal delay circuit 92, and so forth.

As explained above, by delaying the next track, for example, the second track of combination video and audio signals, with respect to the preceding track, for example, the first track, by exactly the time corresponding to 45° minus $\Delta ti$ (45°−$\Delta ti$), as illustrated in FIG. 5A, with respect to one to four channels of combination video and audio signals for eight tracks, the center audio signals AUDIO are arranged orthogonal to the helical tracks.

If this processing is performed twice, then 16 tracks of combination video and audio signals are recorded on the magnetic tape 120 for one field.

As shown in FIG. 5A, even when the same channel of audio signals AUDIO are disposed so as to be orthogonal to and run parallel with the helical tracks by the 8 tracks, when independently rewriting the audio channels, there is the problem that the adjoining tracks become narrower and part of the data is lost. However, track narrowing occurs at the two tracks among the eight which are at the two outer sides. Since, if the audio signals AUDIO on the same channel among eight tracks intersect the helical track at a right angle so as be arranged in parallel, when the audio signals AUDIO on a channel are rewritten, the audio signals AUDIO on the adjoining track, which may be erased by the erasure head, are the signals on the same channel. Thus these same channel signals are erased at once, and thereafter, new signals are recorded thereon. The possibility arises that the audio signals AUDIO which are recorded on the two tracks at the two outer sides cannot be reproduced.

If the outer code (outer parity) is added in a ratio of the data to parity of (8−2):2=6:2 or more, then it is possible to reproduce the 2 tracks of audio signals AUDIO at the two outer sides from the 6 tracks of audio signals AUDIO by the erasure correction. Note that this "erasure correction" is a method of error correction in a case where the location of the error (byte) is known in advance. In general, correction of the same number of bytes as the parity bit added becomes possible. In a digital VTR, in almost all cases, use is made of a "Reed-Solomon product code" construction and in most cases errors which cannot be corrected by inner codes can be corrected by outer codes by setting an error flag. In this embodiment, such erasure correction also is performed. Accordingly, even if the two outside tracks are narrowed due to erasure, errors can be corrected by erasure correction. Note that erasure correction for audio signals AUDIO is completed for each channel of audio signals AUDIO.

In the above example, the redundancy in the case of adding an outer code at a rate of data:parity of at least 6:2 becomes (2/8)×100(%). Increasing the error correcting code in such a way is not inherently preferred from the viewpoint of high density recording. However, the share of the audio signals in the overall combination of video and audio signals usually is at most several percent, while the video signals account for an overwhelmingly large share of the same. Accordingly, as mentioned above, even if an error correcting code is added to the audio signals, there is substantially no effect on the data rate of the combination video and audio signals.

As explained above, by arranging the same channel of audio signals recorded on the magnetic tape 120 in blocks of three or more tracks and recording on the magnetic tape 120 by adding a parity (outer code) enabling correction of errors when a loss occurs in the audio signals AUDIO recorded on the tracks at the two outer sides of the plurality of tracks, it is possible to strikingly lighten the demands on mechanical precision, such as the head width, mounting tolerance, aging, etc. of the multi-head unit 100 and possible to reproduce audio signals AUDIO of a high reliability. Further, there is no need for adopting a technique such as enlarging the guard band, so a high density recording becomes possible as before.

In the above examples, illustration was given of adjusting the phase of the audio signals AUDIO by making the delay times of the first to eighth signal delay circuits 91 to 98 different, but it is possible to adjust the phase of the audio signals AUDIO in the same way as mentioned above even by changing the output timing of the video signals VIDEO output from the first to eighth video signal FIFO circuits 51 to 58 and the audio signals AUDIO output from the first to fourth audio signal FIFO circuits 61 to 64 through the control unit 110. In this case, the delay times of the first to eighth delay circuits 91 to 98 are constant.

Further, it is also possible to make the delay times of the first to eighth signal delay circuits 91 to 98 different and adjust the timing of the video signals VIDEO output from the first to eighth video signal FIFO circuits 51 to 58 and the audio signals AUDIO output from the first to fourth audio signal FIFO circuits 61 to 64.

The second embodiment of the present invention will be explained with reference to FIGS. 6A and 6B.

Analyzing the recording of the combination video and audio signals illustrated in FIG. 5A, the areas A, B, C, and D shown by the broken lines near the two edges of the magnetic tape 12 are not effectively used.

Figure 6A:
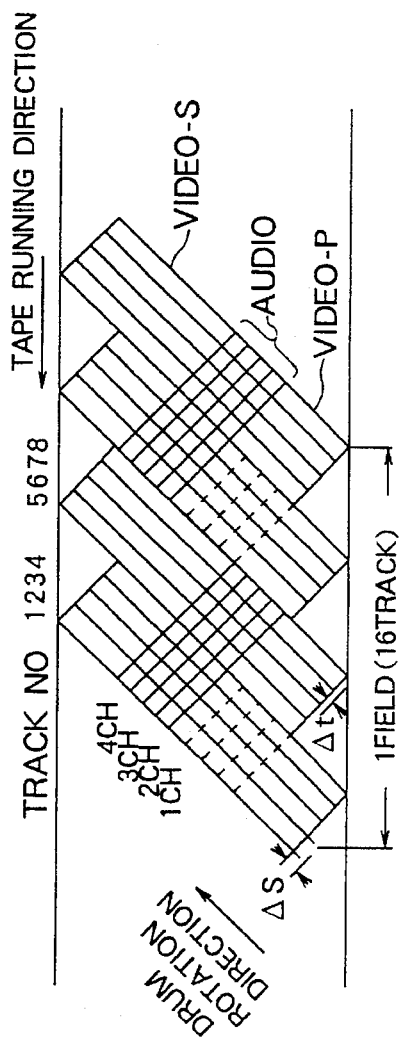
FIG. 6A is a view of a second recording format of audio signals recorded on a magnetic tape by the digital VTR shown in FIG. 3;.

In the second embodiment, as shown in FIG. 6A, effective use is made of the areas A, B, C, and D not used above. In FIG. 6A, the front video signals VIDEO-P are additionally recorded at the position corresponding to the area A shown in FIG. 5A for helical tracks 1 to 4, the back video signals VIDEO-S are additionally recorded at the position corresponding to the area B shown in FIG. 5A for the helical tracks 5 to 8, the front video signals VIDEO-P are additionally recorded at the position corresponding to the area C shown in FIG. 5A for the helical tracks 9 to 12, and the back video signals VIDEO-S are additionally recorded at the position corresponding to the area D shown in FIG. 5A for the helical tracks 13 to 16. That is, in the second embodiment, the video signals VIDEO are recorded at portions not effectively used in the first embodiment.

Figure 6B:
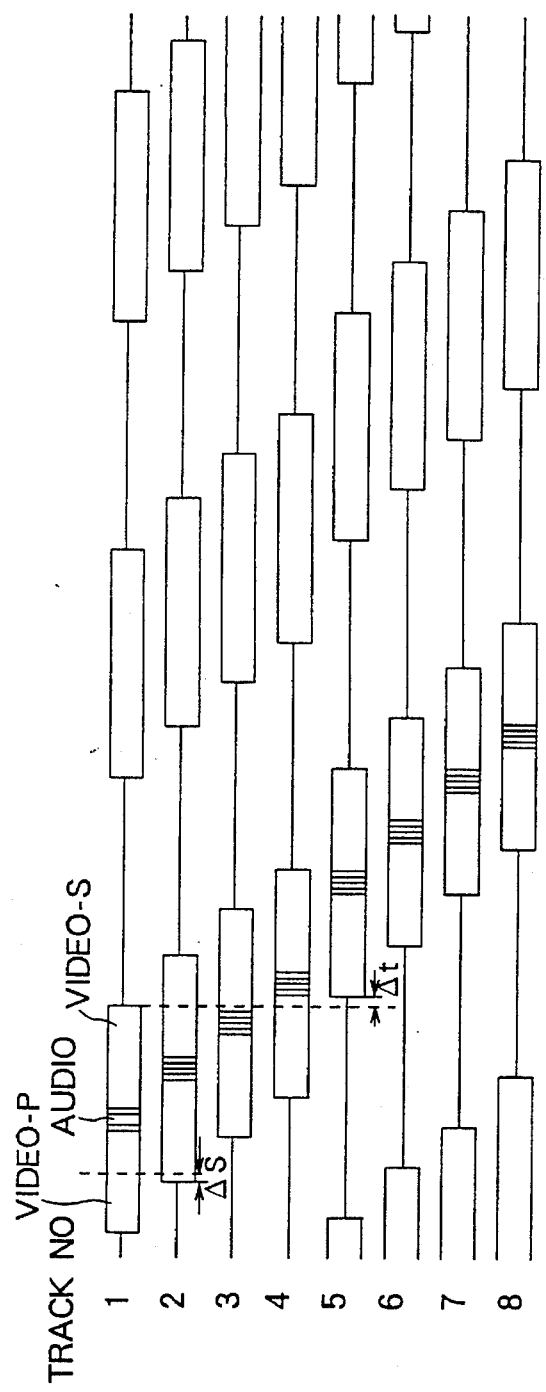
FIG. 6B is a timing chart of the combination video and audio signals showing the recording processing.

The above-mentioned recording can be realized, shown in FIG. 6B, by changing the relative phases of the video signals VIDEO and audio signals AUDIO for each four helical tracks. However, the relative phase can only be shifted with each whole multiple of SYNC (synchronization) blocks, so an offset of Δt for each 4 tracks becomes necessary by the value of the SYNC arrangement between tracks. In this case, (4·Δs−Δt)=n×SYNC block.

Note that in general when recording digital data on a magnetic tape, 100 to 300 bytes are recorded as one block with an inner code, index/address, and SYNC signal added. Such blocks are called SYNC blocks.

The combination video and audio signals shown in FIG. 6B are comprised by the first to eighth signal selection circuits 71 to 78 shown in FIG. 3.

Of course, it is also possible to make the delay times of the first to eighth signal delay circuits 91 to 98 different and to adjust the output timing of the first to eighth video signal FIFO circuits 51 to 58 audio signals AUDIO first to fourth audio signal FIFO circuits 61 to 64.

In the same way as the first embodiment, an outer code and inner code are added to the video signals VIDEO and audio signals AUDIO recorded on the helical tracks of the magnetic tape 120. By this, correction of erasure becomes possible even if narrowing of the two tracks at the two outer sides occurs and part of the audio signals AUDIO is erased.

An explanation will next be made of a modification of the second embodiment.

The video signals VIDEO illustrated in FIG. 6A show the case of recording on the magnetic tape 120 arranged in 4 tracks each, but it is also possible to record video signals VIDEO up to the bottom edges of the magnetic tape 120 for the tracks 1 and 2, the tracks 5 and 6, the tracks 9 and 10, and the tracks 13 and 14 and up to the top edges of the magnetic tape 120 for the tracks 3 and 4, the tracks 7 and 8, the tracks 11 and 12, and the tracks 15 and 16.

The above-mentioned embodiment illustrated the case of recording the combination video and audio signals on the magnetic tape 120 for 16 tracks with two revolutions using the first to eighth magnetic heads 101 to 108 illustrated in FIG. 4 as the multi-head unit 100, but the present invention is not limited to the above-mentioned embodiment.

Further, in the above-mentioned embodiment, the case was illustrated of recording audio signals AUDIO at the center block of the helical tracks, but the recording position of the audio signals AUDIO is not limited to the center block of the helical track. For example, as shown by the broken line in FIG. 6A, it may be shifted. The same applies to the recording format illustrated in FIG. 5A.

Further, the present invention is not limited to the first to eighth magnetic heads 101 to 108 (heads 1 to 8 in FIG. 4) disposed at equal intervals of the multi-head unit 100 illustrated in FIG. 4. The adjustment of timing (phase) of the audio signals AUDIO by the first to eighth video signal FIFO circuits 51 to 58, the first to fourth audio signal FIFO circuits 61 to 64, and the first to eighth signal delay circuits 91 to 98 shown in FIG. 3 is performed in accordance with the disposition of the multi-head unit used.

The point is that in the present invention, when recording combination video and audio signals, the same channel of audio signals AUDIO are recorded arranged in blocks in a direction orthogonal to the helical tracks and outer codes are added to enable erasure correction.

The above-mentioned embodiment as a preferred embodiment illustrates the case of recording video signals VIDEO and audio signals AUDIO on the same track, but the gist of the present invention lies in the point of recording the same channel of audio signals AUDIO arranged in blocks in a direction orthogonal to the helical tracks when recording combination video and audio signals on helical tracks, and the invention is not necessarily limited to recording video signals VIDEO and audio signals AUDIO as combination video and audio signals.

Further, as a preferred embodiment, an explanation was given for adding an outer code to enable correction of erasures, but the invention is not limited to addition of such an outer code.

According to the present invention, in high density recording by neurotracks, there is little effect even if the adjoining tracks are made narrower due to erasure of audio signals of a certain track during single channel editing of audio signals because there are few mechanical limitations, and audio signals can be effectively corrected even if tracks are narrowed.

Still further, according to the present invention, preferably, there can be provided a recording medium which is minimally affected even if a certain track of audio signals of the recording medium, on which video signals and audio signals are recorded on the same helical track, are erased and which enables correction even if track narrowing occurs.

What is claimed is:

1. A system for recording a digital audio signal and a digital video signal on a recording medium, comprising:

assembling means for assembling a plurality of digital audio signals and a plurality of digital video signals to be recorded on a plurality of helical tracks of said recording medium in correspondence with said tracks;

code adding means for adding inner codes and outer codes, of which a parity rate with respect to data is equal to or greater than (N-2):2, where N is an integer equal to or greater than 3, to said assembled signals;

a multi-head unit with N heads for simultaneously recording N helical tracks onto the recording medium;

timing adjustment means for adjusting a timing of said digital audio signals so that said digital audio signals on a same channel are aligned and simultaneously recorded on said N helical tracks of said recording medium in a direction orthogonal to a direction of said N helical tracks and any digital audio signals erased on adjoining tracks during a rewrite of an audio channel are all from the same channel; and recording means for recording said digital audio signals with said timing adjustment and said digital video signals, to which said inner codes and said outer codes are added, on said recording medium.

2. A system according to claim 1, wherein said assembling means assembles said digital audio signals and said digital video signals so that said digital audio signals are recorded between two blocks of said digital video signals in a direction along said helical track.

3. A system according to claim 2, wherein said assembling means assembles said digital audio signals and said digital video signals so that relative positions of said digital audio signals to said digital video signals on said helical tracks are defined that, for said N number of adjoining helical tracks, positions of said digital audio signal on a first half of N/2 helical tracks differ from a positions of said digital audio signals on a latter half of N/2 helical tracks.

4. A method of recording a digital audio signal and a digital video signal on a recording medium, including the steps of:

assembling a plurality of digital audio signals and a plurality of digital video signals to be recorded on a plurality of helical tracks of said recording medium in correspondence with said tracks;

adding inner codes and outer codes, of which a parity rate with respect to data is equal to or greater than (N-2):2, where N is an integer equal to or greater than 3, to said assembled signals;

simultaneously recording N helical tracks onto the recording medium;

adjusting a timing of said digitals audio signals so that said digital audio signals on a same channel are aligned and simultaneously recorded on said N helical tracks of said recording medium in a direction orthogonal to a direction of said N helical tracks and any digital audio signals erased on adjoining tracks during a rewrite of an audio channel are all from the same channel; and recording said digital audio signals with said adjusting timing and said digital video signals, to which said inner codes and said outer codes are added, on said recording medium.

5. A method according to claim 4, wherein in said assembling step, said digital audio signals and said digital video signals are assembled so that said digital audio signals are recorded between two blocks of said digital video signals in a direction along said helical track.

6. A method according to claim 5, wherein in said assembling step, said digital audio signals and said digital video signals are assembled so that relative positions of said digital audio signals to said digital video signals on said helical tracks are defined that, for said N number of adjoining helical tracks, positions of said digital audio signals on a first half of N/2 helical tracks differ from a positions of said digital audio signals on a latter half of N/2 helical tracks.

7. A recording medium according to claim 1, wherein said recording medium comprises a magnetic tape.

8. A system for recording a digital audio signal and a digital video signal, comprising:

means for assembling in predetermined units digital audio signals and digital video signals to be recorded on a plurality of helical tracks of a recording medium in correspondence with said tracks;

means for adding error correcting codes enabling correction of losses in said audio signals recorded on tracks positioned at two outer sides of said plurality of helical tracks, said error correcting codes comprising inner codes and outer codes, a parity rate of said outer code with respect to data being equal to or greater than (N-2):2, where N is an integer equal to or greater than 3;

a multi-head unit with N heads for simultaneously recording N helical tracks onto the recording medium;

means for adjusting a timing of a plurality of audio signals so that said audio signals on a same channel are aligned and simultaneously recorded all together on a plurality of adjoining helical tracks of said recording medium in a direction orthogonal to a direction of the tracks and any digital audio signals erased on adjoining tracks during a rewrite of an audio channel are all from the same channel; and means for recording said audio signals and video signals on said recording medium.

9. A method of recording a digital audio signal and a digital video signal, including the steps of:

assembling in predetermined units said digital audio signals and digital video signals to be recorded on a plurality of helical tracks of a recording medium in correspondence with said tracks;

adding error correcting codes enabling correction of losses in said audio signals recorded on tracks positioned at two outer sides of said plurality of helical tracks, said error correcting codes comprising inner codes and outer codes, a parity rate of said outer code with respect to data being equal to or greater than (N-2):2, where N is an integer equal to or greater than 3;

simultaneously recording N helical tracks onto the recording medium;

adjusting a timing of a plurality of audio signals so that said audio signals on a same channel are aligned and simultaneously recorded all together on a plurality of adjoining helical tracks of said recording medium in a direction orthogonal to a direction of the tracks and any digital audio signals erased on adjoining tracks during a rewrite of an audio channel are all from the same channel; and recording said audio and video signals on said recording medium.

* * * * *